(12) United States Patent
Ils et al.

(10) Patent No.: US 7,048,533 B2
(45) Date of Patent: May 23, 2006

(54) APPARATUS FOR MAKING PLASTIC ARTICLES HAVING AN EMBOSSED PATTERN

(75) Inventors: Peter Ils, München (DE); Peter Lichtinger, Fürstenfeldbruck (DE); Günter Prautzsch, Köln (DE); Timo Günzel, Dachau (DE); Wilhelm Pfister, Schnaittach (DE); Jürgen Schreyer, Lauf (DE); Jürgen Hackert, Grünbach (DE)

(73) Assignees: Krauss-Maffei Kunststofftechnik GmbH, München (DE); Bolta-Werke GmbH, Leinburg (DE)

( * ) Notice: Subject to any disclaimer, the term of this patent is extended or adjusted under 35 U.S.C. 154(b) by 751 days.

(21) Appl. No.: 10/010,967

(22) Filed: Nov. 6, 2001

(65) Prior Publication Data
US 2002/0089088 A1  Jul. 11, 2002

Related U.S. Application Data

(63) Continuation of application No. PCT/EP00/03702, filed on Apr. 26, 2000.

(30) Foreign Application Priority Data
May 7, 1999   (DE) ............................... 199 20 941

(51) Int. Cl.
*B29C 69/02*   (2006.01)

(52) U.S. Cl. .................... 425/576; 425/324.1; 425/385
(58) Field of Classification Search ............. 425/324.1, 425/385, 576; 264/293, 294, 296
See application file for complete search history.

(56) References Cited

FOREIGN PATENT DOCUMENTS

| DE | 43 18 574 A | 12/1994 |
| DE | 195 04 332 A1 | 2/1995 |
| DE | 197 32 353 A1 | 7/1997 |
| EP | 0 495 219 A | 7/1922 |
| EP | 0671 251 A1 | 1/1995 |
| JP | 59182781 A | 10/1984 |

OTHER PUBLICATIONS

Webster's Ninth New Collegiate Dictionary, p. 190, cpoyright 1986.*

* cited by examiner

*Primary Examiner*—Tim Heitbrink
(74) *Attorney, Agent, or Firm*—Henry M. Feiereisen

(57) ABSTRACT

In a method of making plastic articles with embossed pattern, a plastic material is injection-molded in a cavity of a clamping unit of an injection molding machine to form an injection-molded plastic article. A pattern is embossed from a foil strip onto a previously injection-molded plastic article to form a finished plastic product with embossed pattern, whereby the embossing step is decoupled from the injection molding step and carried out separately from a clamping step of the clamping unit.

18 Claims, 3 Drawing Sheets

APPARATUS FOR MAKING PLASTIC ARTICLES HAVING AN EMBOSSED PATTERN

CROSS-REFERENCES TO RELATED APPLICATIONS

This application is a continuation of prior filed copending PCT International application no. PCT/EP00/03702, filed Apr. 26, 2000.

This application claims the priority of German Patent Application Serial No. 199 20 941.3, filed May 7, 1999, the subject matter of which is incorporated herein by reference.

BACKGROUND OF THE INVENTION

The present invention relates to a method of and apparatus for making plastic articles with embossed pattern.

A typical field of application of plastic articles with embossed pattern is the fabrication of injection-molded circuit boards, such as 3-D Molded Interconnected Devices (3-D MID) through hot stamping a pattern of conductor paths from a foil strip onto an injection-molded substrate. MIDs are formed parts with integrated conductive pathways and, compared to conventional circuit boards, afford enormous technical and rationalization potentials while substantially being more environmentally compatible. Through the provision of MIDs, electric and mechanical components can be integrated in circuit boards of almost any shape. MIDs enable completely different functions and contribute to a miniaturization of products. By saving mechanical components, the assembly is simplified while reliability in operation is enhanced.

Heretofore, plastic articles with a pattern that has been stamped under hot conditions have been made through several separate steps in a same way as the afore-mentioned 3-D MIDs. Reference is made, e.g., to German Pat. No. DE 197 32 353 A1. Plastic articles are initially made by using a conventional injection molding machine. Subsequently, the injection-molded plastic articles are subject to a stamping process in which the pattern is transferred from a foil strip onto the plastic articles under hot conditions. In order to realize a clean embossing operation, the plastic articles should be fat-free and dirt-free and pre-heated to a different temperature depending on the plastic material being used. In the event of intermediate storage, the plastic articles must therefore be preheated, cleaned and, possibly, degreased, before the embossing operation can be applied. Moreover, the plastic articles must be accurately positioned before placing the plastic foil strip in the stamping press. As currently the placement of the foil strip is done manually, an added error source must be accepted, when fabricating MIDs.

European Pat. No. EP 0 671 251 A1 describes an injection molding machine which has several processing stations, in particular when making multi-components injection-molded parts, whereby the actual injection steps and the other processing steps, such as cooling, ejecting, spraying and shaping of the injection-molded articles, are carried out in separate stations. By subdividing the overall production process in as many small units as possible, the cycle time should be shortened. This, however, significantly complicates the structure of the injection molding machine.

German Pat. No. 195 04 332 A1 describes the simultaneous fabrication and assembly of individual products through injection molding. The injection molding machine has cavities for molding plastic articles, wherein each injection-molding operation produces simultaneously in the respective cavities several different injection-molded articles which are then put together in the assembly spaces to a finished plastic product. A closing of the mold results in a closing of the cavities as well as of the assembly spaces, which remain closed during the injection process. During this time, the assembly spaces are inaccessible. This type of molding machine is not suitable for supply of foil strip material and transfer of patterns from the foil strip onto the injection-molded articles.

It would therefore be desirable and advantageous to provide an improved method and apparatus for making plastic articles that obviates prior art shortcomings and allows fabrication of plastic articles with an embossed pattern in a clean, rapid and precise manner, while still experiencing as little waste as possible.

SUMMARY OF THE INVENTION

According to one aspect of the present invention, a method of making plastic articles with embossed pattern, includes the steps of injection molding plastic material in a cavity of a clamping unit of an injection molding machine to form an injection-molded plastic article; and embossing a pattern from a foil strip onto a previously injection-molded plastic article to form a finished plastic product with embossed pattern, whereby the embossing step is decoupled from the injection molding step and carried out separately from a clamping step of the clamping unit.

The present invention resolves prior art problems by using a single machine, that is an injection molding machine, to injection-mold the plastic articles and immediately thereafter to transfer in an embossing step the pattern from the foil strip onto the plastic articles. Thus, the plastic articles are already at the required temperature before undergoing the embossing operation, by suitably controlling the cooling time of the molded articles. Error sources, as experienced during manual placement of pre-fabricated plastic articles in stamping presses, are now eliminated. In order to reduce the overall number of work stations to a minimum and thus to shorten the production time for a finished product, the embossing operation of one workpiece can be carried out at a same time as the injection-molding operation of another workpiece or possible other processing steps such as ejection of finished products and/or placement of cores, i.e. while the mold is closed. This is possible because, unlike the prior art, closing of the injection mold initiates solely the injection molding operation which is then executed when the mold is closed, while the embossing operation is carried out through a separate motion, divorced from the closing operation, but still spatially integrated in the injection molding machine. As a result, the overall cycle time for fabricating a finished product with embossed pattern is reduced to the duration of the actual injection-molding operation.

According to another aspect of the present invention, an injection molding machine for making plastic articles, includes an injection-molding unit; a clamping unit having a fixed mold mounting plate and a moving mold mounting plate; at least one injection molding station having an injection mold which includes a fixed mold half attached to the fixed mounting plate, and a moving mold half attached to the moving mounting plate; at least one embossing station disposed between the fixed and moving mounting plates, wherein the embossing station includes a stamping plunger, movable between the mounting plates and having attached thereon stamping tools, and a reservoir of a foil strip; and a transfer unit for interaction with the injection molding and embossing stations.

An injection molding machine according to the present invention can be made simple in structure because the manufacturing process is not split into a multiplicity of steps, such as injection molding, cooling, ejection etc., carried out in separate stations.

Suitably, the mounting plate that is operatively connected to the stamping plunger is provided with a bore for passage of the stamping plunger. In this way, a great plunger stroke can be provided and sufficient clearance is still afforded in the embossing station to allow easy execution of other processing steps, such as insertion of cores and/or ejection of the finished plastic article with embossed pattern, at a same time as the injection-molding operation while the injection mold is closed. Opening of the injection molding machine is only required to a degree that allows further advance of the injection-molded plastic article to undergo the next processing operation.

According to another feature of the present invention, an auxiliary element may be provided on the fixed mounting plate or moving mounting plate, for supporting the attached half of the injection mold, wherein the stamping plunger is movably guided in the auxiliary element. In this way, all components of the injection molding machine can be exposed to a substantially even load, despite the eccentric arrangement of the injection molding position, on the one hand, and the large clearance in the embossing station, on the other hand. Tilting moments encountered during eccentric injection molding operation can thus be compensated.

According to another feature of the present invention, an injection molding machine may include only a single injection station and a single embossing station, wherein the moving mold half is made of two identical tools. In this way, existing tools can be used for injection molding as well as for the embossing operation.

BRIEF DESCRIPTION OF THE DRAWING

Other features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
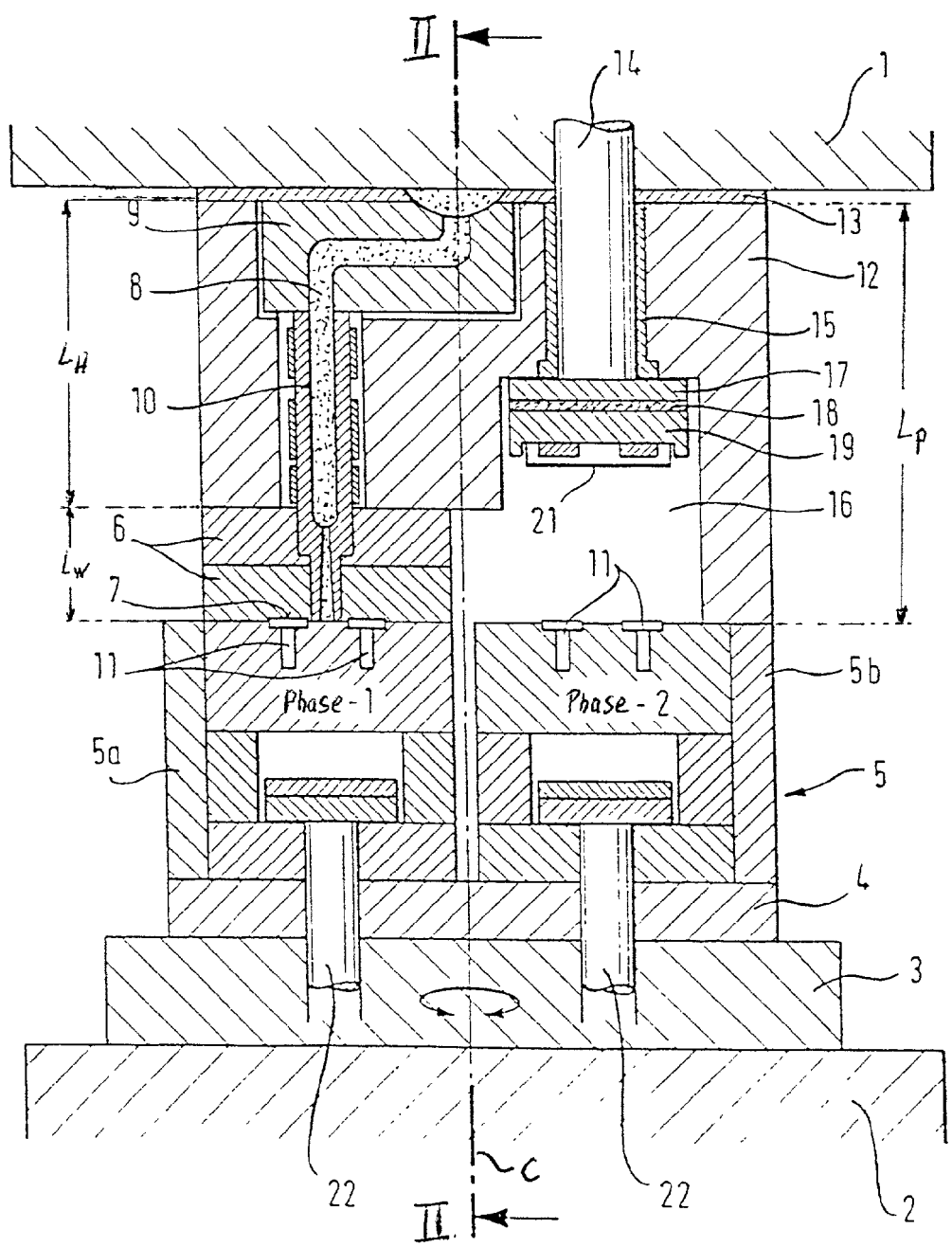
FIG. 1 is a longitudinal section of a clamping unit of an injection molding machine according to the present invention.

Throughout all the Figures, same or corresponding elements are generally indicated by same reference numerals.

Turning now to the drawing, and in particular to FIG. 1, there is shown a longitudinal section of a clamping unit of an injection molding machine according to the present invention. It is to be understood by persons skilled in the art that the term "injection molding machine" is used here in a generic sense and may include a horizontal injection molding machine as well as a vertical injection molding machine.

Figure 3:
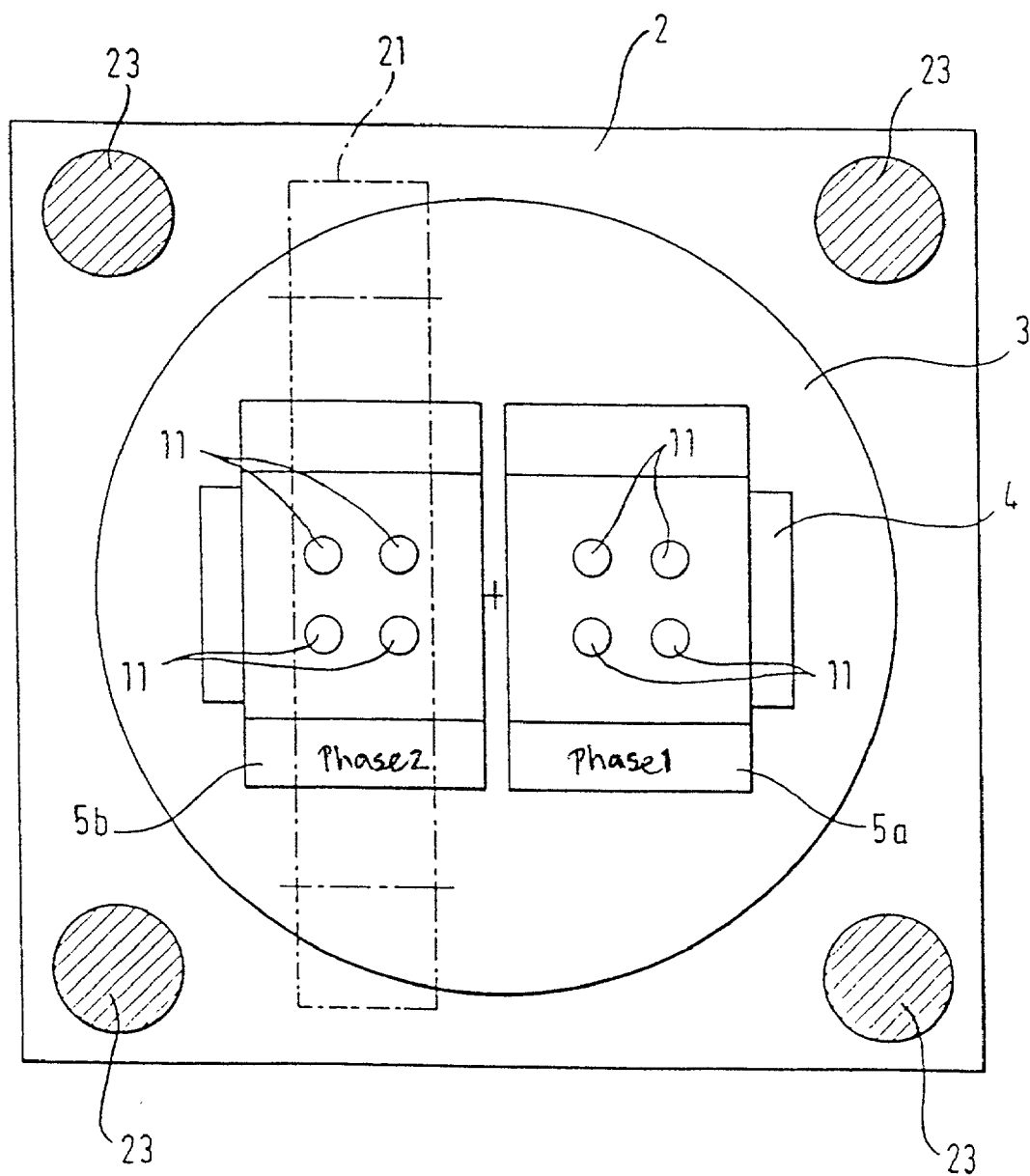
FIG. 3 is a sectional view of the clamping unit, taken along the line III—III in FIG. 2.

The clamping unit includes a fixed mold mounting plate 1 and a moving mold mounting plate 2 in opposite relationship, with the mounting plate 2 traveling on rods 23, shown in FIG. 3, along the center line C. A rotary table 3 is mounted on the mounting plate 2, e.g., via braces, and supports a base plate 4. Mounted onto the base plate 4 is a mold half, generally designated by reference numeral 5 and forming part of a molding station with an injection mold comprised of the mold half 5 and a mold half 6. The mold half 5 thus represents the moving component of the mold while the mold half 6 represents the fixed component of the injection mold. In the non-limiting example of FIG. 1, the mold half 5 is comprised of two identical tools 5a, 5b. Of course, the mold half 5 may also have a single piece configuration. When the mold halves 5, 6 of the injection mold are closed, cavities 7 are demarcated for receiving plastic material 8 injected via a sprue bushing 9 with elbowed pathway, and a hot runner 10, for subsequent formation of plastic articles 11 during phase-1 of the fabrication precess. The sprue bushing 9 and the hot runner 10 are integrated in an auxiliary element in the form of a retainer block 12 which is secured to the fixed mounting plate 1 via an interposed backing plate 13. The retainer block 12 has a throughbore for passage of a stamping plunger 14 that forms part of an embossing station. In a clamping direction of the clamping unit, the retainer block 12 has a length $L_P$ in the embossing station, i.e. area of the stamping plunger 14, which length $L_P$ is equal to the sum of the length $L_W$ of the mold half 6 and the length $L_H$ of the retainer block 12 In the molding station, i.e. $L_P=L_W+L_H$, to establish a symmetric force flow during clamping operation.

The retainer block 12 has a throughbore for passage of a stamping plunger 14 that forms part of the embossing station. The stamping plunger 14 is movably guided hydraulically and/or pneumatically in a guide bushing 15 which is suitably secured in the throughbore of the retainer block 12. For ease of illustration, the hydraulic and/or pneumatic components for moving the stamping plunger 14 have not been shown in the drawings. In the area of the stamping plunger 14, the fixed mounting plate 1 has a suitably sized bore in alignment with the throughbore in the retainer block 12 for passage of the stamping plunger 14 to allow provision of a suitably great stamping stroke and thus formation of a sufficient clearance 16. The provision of such clearance 16 permits the execution of further operations, such as ejection or removal of the finished products and, possibly, placement of cores to be encapsulated by injection molding, in addition to the embossing operation.

Figure 2:
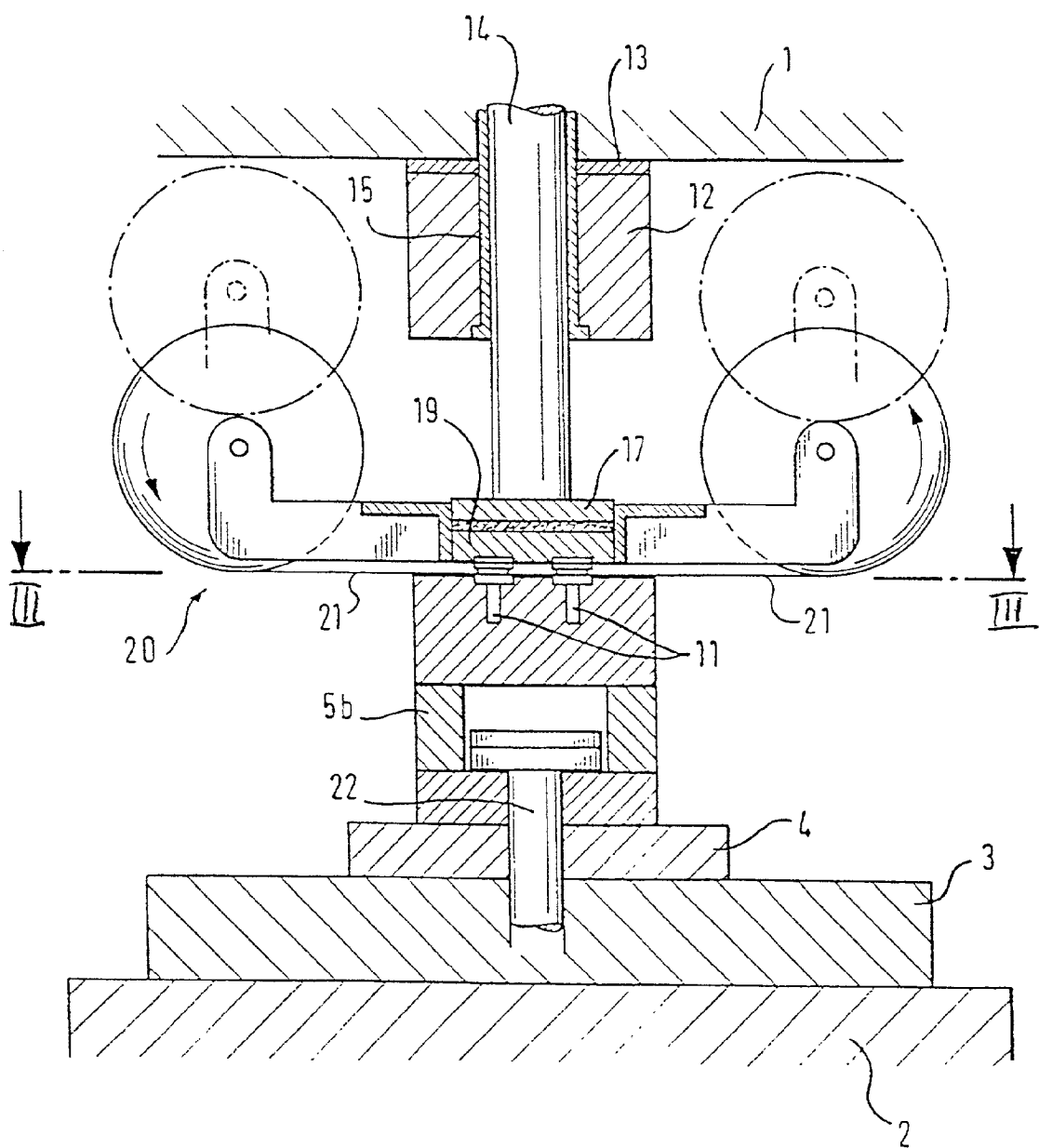
FIG. 2 is a sectional view of the clamping unit, taken along the line II—II in FIG. 1.

As shown in FIG. 1, the stamping plunger 14 has a clearance-proximal head portion 17 which has attached thereon a heatable stamping die 19 at interposition of a thermally insulating plate 18, and a roll-off device, generally designated by reference numeral 20 and shown in more detail in FIG. 2. The roll-off device 20 supplies a foil strip 21 which carries a pattern to be transferred onto the injection molded articles 11 and travels underneath the stamping die 19, as indicated in FIG. 3 by dashdot line. Examples of patterns may include an electric conductor path structure or a design structure for aesthetic reasons.

FIG. 1 shows the situation in which the mold halves 5, 6 of the injection mold are closed and the stamping plunger 14 occupies the retracted position, whereas FIG. 2 shows the situation in which the stamping plunger 14 is moved into the clearance 16 to press in phase-2 the advanced foil strip 21 against the plastic articles 11 that have been previously injection molded in phase-1 and transferred by the rotary table 3 to the embossing station. As the foil strip 21 is pressed against the plastic articles 11, the foil strip 21 is transferred in accordance with the pattern on the stamping die 19 onto the plastic articles 11. For ease of understanding, the roll-off device 20 is shown in FIG. 2 also by way of dashdot line to depict the disposition when the stamping plunger 14 occupies the retracted position, shown in FIG. 1.

Disposed behind the cavities 7 and the plastic articles 11 are ejectors 22 for knocking out the plastic articles 11 from the injection mold, after the plastic articles 11 have undergone the embossing operation and transfer of the pattern onto the plastic articles 11.

The injection mold operates as follows: In phase-1, plastic material is injected through hot runner 10 into the cavities 7 to mold the plastic articles 11, while at the same time previously injection-molded plastic articles 11 undergo the embossing operation in phase-2. A cycle of the injection machine is as follows:

Phase-1:

As soon as the clamping unit is closed and the injection mold is clamped, plasticated material is injected into the cavities, which may, optionally, have cores incorporated therein. At the conclusion of the injection operation, the injection machine applies after-pressure and subsequently the cooling time commences.

Phase-2:

At the same time parallel to phase-1, the embossing operation is implemented by stamping the desired pattern upon the plastic articles 11 previously injection molded in phase-1. During the embossing operation, the stamping plunger 14 is moved at a predetermined speed from the initial retracted position to the stamping position to press the foil strip 21, supplied and kept under tension by the roll-off device 20, against the plastic articles 11. Travel and pressure of the stamping plunger 14 are suitably controlled by a proportional valve, not shown. The force as well as the speed of the stamping plunger 14 are adjustable as profile. Control of parameters and input of desired values is implemented through machine control. After being held in position for the necessary retention time to transfer the pattern onto the plastic articles 11, the stamping plunger 14 returns to the initial position and the foil strip 21 is indexed ahead. Subsequently, the finished plastic products provided with the pattern are ejected or removed by a robot, not shown. The empty cavities in phase-2 portion of the injection machine may now receive, optionally, cores to be molded around.

After termination of the cooling period, the injection mold is opened, and the moving half 5 is rotated by 180° by the rotary table 3 so that the plastic articles 11 molded in phase-1 are transferred from the injection station to the embossing station, and the empty cavities with or without cores from phase-2 are transferred from the embossing station to the injection station. The next cycle can now begin.

Persons skilled in the art will understand that the injection molding machine may run more than two phases, e.g., when multi-component injection molding is desired before the embossing operation. In this case, the rotary table is subdivided in a respective number of stations. If need be, an embossing station may also be provided with several stamping plungers with foil strip, in the event the number and arrangement of the plastic articles requires such a configuration. It will also be understood by persons skilled in the art that is certainly possible to so configure the clamping unit as to secure the rotary table 3 to the moving mounting plate 2 and the stamping plunger 14 to the fixed mounting plate 1, and such configuration is also considered to be covered by this disclosure. Although the foregoing drawing shows the arrangement of the roll-off device 20 at the stamping plunger 14, is, of course, also conceivable to secure the roll-off device to a fixed component, e.g. the fixed mounting plate or the retainer block, without departing from the spirit of the present invention.

While the invention has been illustrated and described as embodied in a method of making plastic articles having embossed pattern, and apparatus for carrying out the method, it is not intended to be limited to the details shown since various modifications and structural changes may be made without departing in any way from the spirit of the present invention.

What is claimed as new and desired to be protected by Letters Patent is set forth in the appended claims:

What is claimed is:

1. An injection molding machine for making plastic articles with an embossed pattern, comprising:
a clamping unit having a fixed mold mounting plate and a moving mold mounting plate;
at least one injection molding station accommodated in the clamping unit and having an injection mold which includes a fixed mold half attached to the fixed mounting plate, and a moving mold half attached to the moving mounting plate;
at least one embossing station disposed in the clamping unit between the fixed and moving mounting plates, wherein the embossing station includes a stamping plunger, movable between the mounting plates and having attached thereon stamping tools, and a reservoir of a foil strip; and
transfer means for interaction with the injection molding and embossing stations.

2. The injection molding machine of claim 1, wherein the transfer means includes a rotary table.

3. The injection molding machine of claim 2, wherein the turntable is secured to the fixed mounting plate, wherein the turntable has recesses of a number equaling a number of injection-molding and embossing steps, wherein the fixed mounting plate has recesses in an area of the injection molding positions, and wherein the stamping plunger is operatively connected to the moving mounting plate.

4. The injection molding machine of claim 2, wherein the rotary table is secured to the moving mounting plate, and wherein the stamping plunger is operatively connected to the fixed mounting plate.

5. The injection molding machine of claim 1, wherein one or more injection units are movable from one side into a space between the mounting plates, wherein the stamping plunger is operatively connected to one of the fixed mold half and moving mold half.

6. The injection molding machine of claim 1, wherein the stamping plunger is operatively connected to one of the mounting plates, wherein said one mounting plate has a born for passage of the stamping plunger.

7. The injection molding machine of claim 1, and further comprising an auxiliary element, provided on one of the fixed mounting plate and moving mounting plate, for supporting the attached half of the injection mold, wherein the stamping plunger is movably guided in the auxiliary element.

8. The injection molding machine of claim 7, wherein the auxiliary element has a guide bushing for movably guiding the stamping plunger.

9. The injection molding machine of claim 7, wherein the auxiliary element has in clamping direction a length in an area of the stamping plunger which length is equal to the sum of a length of the one of the fixed and moving mounting plates in clamping direction and a length of the auxiliary element in this area.

10. The injection molding machine of claim 1, wherein the fixed mounting plate has a central injection area and a sprue bushing with deflection channel.

11. The injection molding machine of claim 1, including a single said injection station and a single said embossing station, wherein the moving mold half is made of two identical tools.

12. The injection molding machine of claim 1, and further comprising a roll-off device, attached to the stamping plunger, for supply of the foil strip.

13. The injection molding machine of claim 12, wherein the roll-off device is secured to a fixed position.

14. A clamping unit for an injection molding machine, comprising:
   an injection molding station; and
   an embossing station, disposed side-by-side to the injection station, for pressing a pattern onto another plastic article previously injection-molded in the injection molding station,
   wherein the injection molding station and the embossing station share a common tool which forms part of a mold half in the injection molding station and at a same time a holder for the injection-molded plastic article in the embossing station; and
   transfer means for operating the common tool between the injection molding and embossing stations.

15. The clamping unit of claim 14, wherein the transfer means is a rotary table.

16. The clamping unit of claim 14, and further comprising a retainer block in confronting disposition to the common tool, wherein the embossing station includes a stamping plunger received in the retainer block and movable in a direction of the common tool for pressing a foil strip against the previously injection molded plastic article to emboss the pattern.

17. The clamping unit of claim 16, wherein the injection molding station includes a sprue bushing and a hot runner received in the retainer block for feeding plastic material to a cavity delineated by the tool and another mold half of the injection molding station.

18. The clamping unit of claim 16, and further comprising a roll-off device, attached to the stamping plunger, for supply of the foil strip.

* * * * *